US012801437B2

(12) United States Patent
Brambila et al.

(10) Patent No.: US 12,801,437 B2
(45) Date of Patent: Nov. 17, 2026

(54) PROGRAMMING TASK SUPPORTING MATERIAL GENERATION

(71) Applicant: International Business Machines Corporation, Armonk, NY (US)

(72) Inventors: Ana Paula Brambila, São Paulo (BR); Thiago Bianchi, Hortolandia (BR); Marco Aurelio Stelmar Netto, São Paulo (BR); Thiago Roberto Fontes Iunes, São Paulo (BR)

(73) Assignee: International Business Machines Corporation, Armonk, NY (US)

( * ) Notice: Subject to any disclaimer, the term of this patent is extended or adjusted under 35 U.S.C. 154(b) by 600 days.

(21) Appl. No.: 17/514,009

(22) Filed: Oct. 29, 2021

(65) Prior Publication Data

US 2023/0140791 A1 May 4, 2023

(51) Int. Cl.

*G06F 16/93* (2019.01)
*G06F 9/50* (2006.01)
*G06Q 10/0631* (2023.01)
*G06Q 10/10* (2023.01)
*G06Q 10/101* (2023.01)

(52) U.S. Cl.

CPC ............ *G06F 9/5027* (2013.01); *G06F 16/93* (2019.01)

(58) Field of Classification Search

None

See application file for complete search history.

(56) References Cited

U.S. PATENT DOCUMENTS

| | | | |
|---|---|---|---|
| 6,606,480 | B1 | 8/2003 | L'Allier |
| 6,666,687 | B2 | 12/2003 | Stuppy |
| 6,688,888 | B1 | 2/2004 | Ho |
| 8,181,167 | B2 | 5/2012 | Zhao |
| 8,457,544 | B2 | 6/2013 | German |
| 8,602,793 | B1 | 12/2013 | Sniedzins |
| 8,775,515 | B2 | 7/2014 | Lippert |
| 8,831,997 | B2 | 9/2014 | Kortemeyer |
| 8,874,023 | B2 | 10/2014 | Elzinga |
| 9,626,875 | B2 | 4/2017 | Gal |
| 10,290,221 | B2 | 5/2019 | Stacy |

(Continued)

FOREIGN PATENT DOCUMENTS

| | | | |
|---|---|---|---|
| AU | 2018229454 | A1 | 10/2018 |
| CN | 111931465 | A | 11/2020 |
| RU | 2235366 | C2 | 8/2004 |

OTHER PUBLICATIONS

Brunette, "Development of Educational and Training Materials on Safety and Health", Family & Community Health, Jul. 2005, pp. 253-266, vol. 28, Issue 3.

Dutson et al., "A Review of Literature on Teaching Engineering Design Through Project-Oriented Capstone Courses", Journal of Engineering Education, Jan. 1997, pp. 17-28, vol. 86, Issue 1.

(Continued)

*Primary Examiner* — Mustafa A Amin

(74) *Attorney, Agent, or Firm* — Harrity & Harrity, LLP

(57) ABSTRACT

The present specification describes a computer-implemented method. According to the method, a programming task to be executed is received. A completed task that is similar to the programming task to be executed is identified from a database of completed tasks. Supporting documentation associated with the completed task is extracted and supporting material associated with the completed task is generated and transmitted to a computing device which is to execute the programming task.

16 Claims, 8 Drawing Sheets

(56) References Cited

U.S. PATENT DOCUMENTS

| | | | | |
|---|---|---|---|---|
| 2002/0170565 | A1* | 11/2002 | Walker | G16H 15/00 128/920 |
| 2005/0216891 | A1 | 9/2005 | Sundararajan | |
| 2006/0167992 | A1* | 7/2006 | Cheung | H04L 12/1827 709/204 |
| 2008/0288474 | A1* | 11/2008 | Chin | G06F 16/3337 |
| 2009/0148817 | A1 | 6/2009 | Lang | |
| 2013/0189658 | A1 | 7/2013 | Peters | |
| 2015/0039286 | A1* | 2/2015 | Nikoulina | G06F 40/40 704/2 |
| 2015/0206441 | A1 | 7/2015 | Brown | |
| 2015/0268950 | A1* | 9/2015 | Dhoolia | G06F 8/36 717/120 |
| 2017/0083290 | A1 | 3/2017 | Bharthulwar | |
| 2019/0114300 | A1* | 4/2019 | Miltsakaki | G06F 40/216 |
| 2019/0303107 | A1* | 10/2019 | Kelly | G06F 9/453 |
| 2020/0242140 | A1* | 7/2020 | Xu | G06N 3/08 |
| 2020/0293825 | A1 | 9/2020 | Ji | |

OTHER PUBLICATIONS

Lamancusa et al., "The Learning Factory—Integrating Design, Manufacturing And Business Realities Into Engineering Curricula—A Sixth Year Report Card", International Conference on Engineering Education, Aug. 2001, 6 pages.

Moonen, "Toward an Industrial Approach to Educational Software Development" Designing Computer-Based Learning Materials, NATO ASI Series, 1986, 33 pages, vol. 23.

Rokou et al., "Modeling Web-based Educational Systems: process Design Teaching Model", Educational Technology & Society, 2004, pp. 42-50, vol. 7, Issue 1.

Schoenmaker et al., "A Methodology for the Development of Educational Software", Eurit 86: Developments in Educational Software and Courseware, 1987, pp. 235-242.

Unknown, "Method and Approach for Unifying Test Automation, User Guide Production and Training Material Production for Software Development", An IP.com Prior Art Database Technical Disclosure, IP.com No. IPCOM000202775D, Dec. 31, 2010, 10 pages.

* cited by examiner

PROGRAMMING TASK SUPPORTING MATERIAL GENERATION

BACKGROUND

The present invention relates to programming task execution, and more specifically to generating cross-industry supporting material for a programming task to be executed.

SUMMARY

According to an embodiment of the present invention, a computer-implemented method is described. According to the method, a programming task to be executed is received. A system identifies, from a database of completed tasks, a completed task that is similar to the programming task to be executed. The system extracts supporting documentation associated with the completed task that is similar to the programming task to be executed and generates and transmits supporting material associated with the completed task to a computing device to execute the programming task.

The present specification also describes a system. The system includes a database of completed programming tasks and associated supporting documentation per completed programming task. A cross-ontology handler of the system identifies from completed tasks in the database, terms that are different but similar to terms in the programming task to be executed. A task similarity analyzer of the system identifies, from the database, a completed task that is similar to a programming task to be executed. A document extractor extracts supporting documentation associated with the completed task that is similar to the programming task to be executed. The system also includes a supporting material generator to generate supporting material associated with the completed task to a computing device to execute the programming task. A semantic analyzer semantically analyzes a deliverable associated with the programming task to be executed.

The present specification also describes a computer program product. The computer program product includes a computer readable storage medium having program instructions embodied therewith. The program instructions are executable by a processor, to cause the processor to: receive, by the processor, a programming task to be executed and translate industry-specific terms in the programming task to non-specific terms applicable across industries. The instructions are also executable by the processor to cause the processor to receive a user profile for a developer to execute the programming task, wherein the user profile indicates a level of expertise of the developer and identify a target level of abstraction for the supporting material based on the level of expertise of the developer. The program instructions are also executable by the processor, to cause the processor to extract supporting documentation associated with the completed task that is similar to the programming task to be executed and display supporting material associated with the completed task to a computing device to execute the programming task via a navigable graph, wherein the navigable graph is presented at a hierarchical level to match the target level of abstraction.

DETAILED DESCRIPTION

Figure 1:
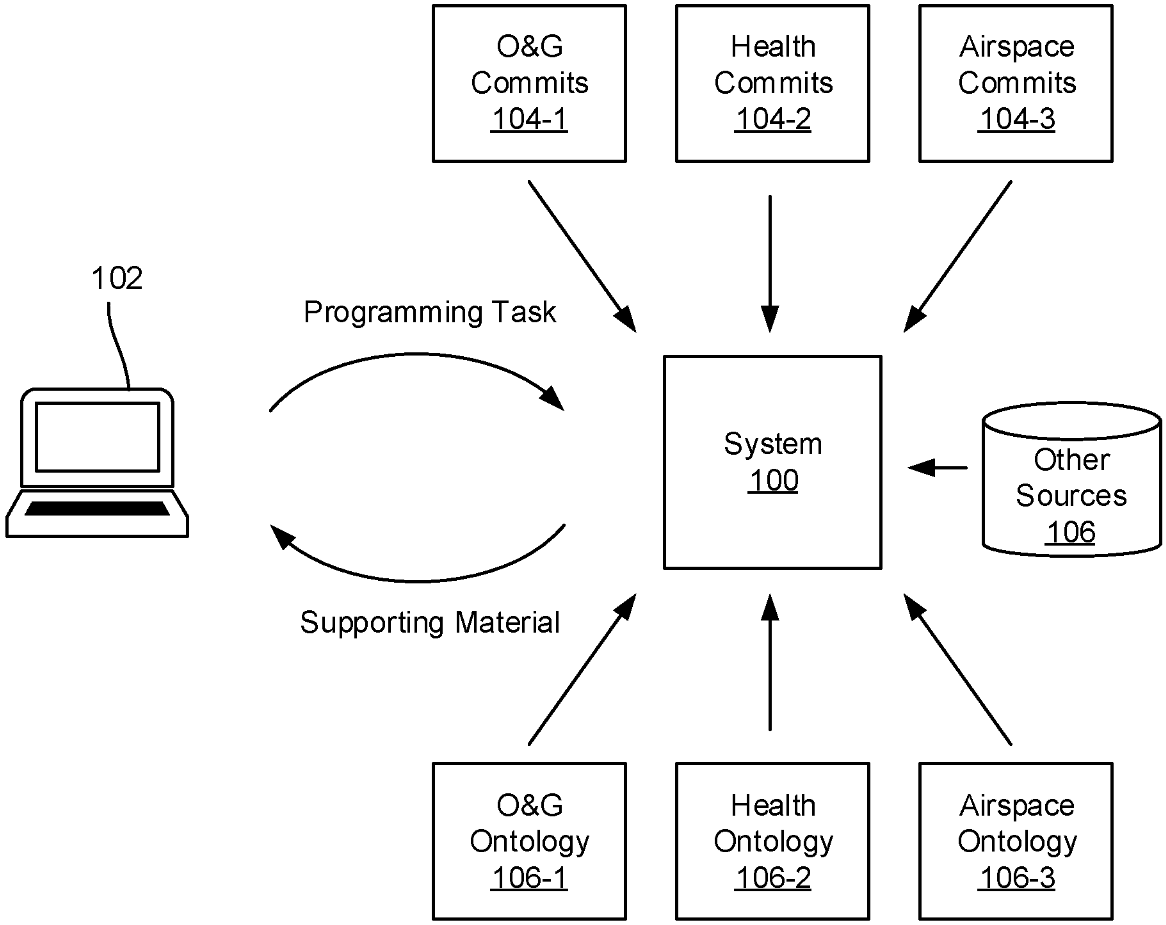
FIG. 1 depicts an environment for generating supporting material for a programming task, according to an example of the principles described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The role of computing devices in modern society is increasing year over year. In fact, it is not uncommon for a user to interact with multiple computing devices a day, either locally or remotely via a network. Among a variety of tasks, developers 1) ensure that program code of computing devices execute as intended and 2) develop new program code to carry out new functionalities. In general, a developer should have some degree of familiarity with a particular subject while performing a programming task related to that subject. However, the knowledge dictated by a programming task in a specific industry may not be readily available and pre-established material with no specific focus may not help the developer to effectively acquire the correct knowledge to adequately carry out the programming task. That is, unless a developer is familiar with a particular industry, the developer may have to absorb diverse, complex, and large resources to perform industry-aware programming tasks.

As a specific example, a developer may be assigned to write source code or change a configuration file within an oil and gas paradigm. A work order may be generated which describes the programming task to be executed. As there is industry-specific context both in terms used and programming code generated, there may be industry-specific practices used to carry out the programming tasks within that industry. However, a developer may be new to the industry, or may be experienced in another industry. As such, in order to execute a programming task in the new industry, the developer may review and analyze tens or hundreds of deliverables, supporting documentation, etc., before he/she can begin work on the programing task in the new industry. As a specific example, a developer may have multi-year experience in the oil and gas industry and be familiar with the nomenclatures, processes, and ontology of that industry, but may be moved to another industry such as finance. It may be that the nomenclatures, protocols, and ontology between the oil and gas and finance industries may share some similarities, however, there may be differences and coming up to speed on the finance industry may be labor-intensive and may result in program code that is inefficient and may not function as intended.

Accordingly, the system of the present specification may receive certain input, such as the programming task to be executed and a profile of the developer which indicates their field of expertise. Based on this input, the system may generate supporting material that draws upon the experience of the developer in their previous field of expertise to reduce the quantity of materials consumed in generating code in the new field. That is, the system may generate supporting materials for a finance programming task knowing that the developer is a senior level developer coming from the oil and gas industry. Accordingly, the present systems and methods build customized supporting materials to execute industry-aware program code tasks.

Put another way, programming tasks depend upon industry domain knowledge, such that a developer should be familiar with the subject matter and programming protocols, processes, and ontology of the industry in which he/she works. However, to become familiar, a developer may spend several hours reading through different materials, which apart from being diverse, may be very long. The challenge is that the developer may not know which aspects of such documents he/she should pay more attention while executing a programming task. Moreover, as there may be industry-specific ontologies and practices, if such practices are not complied with, the work product may not perform as intended. That is, the output of the programming task may be ineffective, inefficient, and may not achieve the desired outcomes.

Accordingly, the present system relies on the use of semantic analysis of deliverables (e.g., code, config files) to calculate the similarity level of a programming task to be completed with tasks already completed. A cross-industry ontology handler may match the completed tasks with the task to be performed notwithstanding a difference in terminology, nomenclature, constructs, or practices with another industry. In an example, a machine-learning system builds a hierarchical cluster that is used as navigable graph by the developer to navigate the supporting material that is generated.

As such, the present system streamlines the generation of supporting material such that a more efficient code output is generated. A particular example is now provided. In this example, an organization may have completed programming tasks for the oil and gas industry as well as for the solar industry. Both may include programming tasks for asset management and work management, but each may have some particular standards to comply with such that some programming task constructs are different. As a particular example, an oil and gas program code may have a test to implement a change status rule for an asset work order from awaiting approval to approved. Before marking a work order approved, there may be some validations codes which correspond to items checked against the asset and work order before allowing a user to do a status change. The items to be checked may be specific to the oil and gas industry.

In the solar industry there may be a similar status change for an asset work order from awaiting approval to approved. However, the items to be checked against the asset may be different and there may be other differences. Accordingly, the present specification provides industry specific content for the programming task in the solar industry while building off any previous experience a developer may have in the oil and gas industry.

Such a system, method, and computer program product may 1) generate and provide supporting material that is specific to a particular programming task; 2) is specific to the background of the user, rather than being generic, 3) results in quicker programming task completion; and 4) provides more intelligent solutions as extraneous and irrelevant supporting material is excluded from being generated.

As used in the present specification and in the appended claims, the term "supporting documentation" refers to the raw content associated with a completed task prior to inference of an abstraction level classifier or text classifier. Supporting documentation may include such things as system help documents, examples of source codes, and examples of configuration files among others.

As used in the present specification and in the appended claims, the term "supporting material" refers to the supporting documentation as altered by an abstraction level classifier or text classifier. The supporting material includes the data after the system infers an abstraction level classifier or text classifier by employing machine learning techniques such as support vector machine (SVM), Naïve Bayes, and others.

As used in the present specification and in the appended claims, the term "a number of" or similar language is meant to be understood broadly as any positive number including 1 to infinity.

FIG. 1 depicts an environment for generating supporting material for a programming task, according to an example of the principles described herein. A developer, via a computing device (102) may be tasked with executing a programming task. The programming task may take a variety of forms including changing a configuration file, updating an existing program code file, and/or generating a new program code file. However, to generate a more effective outcome of the task, the developer may desire to analyze and incorporate various industry-specific best practices, which may involve reading and digesting numerous examples, code snippets, support articles, and other secondary resources. In some examples, the amount of material to be ingested may be prohibitively large and may hinder the developer's ability to execute the task. Moreover, it may be that the developer incorporates out-of-date practices in executing the task. Accordingly, the system (100) may enhance the development of a deliverable and/or execution of a programming task by intelligently providing supporting materials to the user through the computing device (102). That is, the system (100) ensures an industry-specific programming task when such would otherwise be unavailable due to limitations on the available secondary sources and/or inability to access the secondary sources.

In some examples, this may include drawing supporting documents from other industries. For example, within different industries there may be different "commits," wherein a commit (104) refers to some aspect of the program code that has been implemented and rolled out. Commits (104) may be referred to as versions of a particular program code. Moreover, within different industries there may be specific ontologies (106), wherein an "ontology" refers to domain specific vocabulary, variables, etc. used in a particular industry. As described above, there may be some similarities between different industries, for example oil and gas may have work order approval program code. However, the specific components of the program code may be different per industry. That is, each industry may have its own commits (104-1, 104-2, 104-3) and ontologies (106-1, 106-2, 106-3). Rather than scouring un-indexed documentation, the system (100) provides intelligently filtered information to generate industry-specific supporting material. These commits (104) and ontologies (106) may be stored in a database of the system (100), or in a database that is accessible by the system (100). The system (100) may also rely on other sources (106) of documents. In addition to the commits (104) and ontologies (106), the system (100) may rely on other sources (106) such as user guides, system help documents, redbooks, tickets, and user feedback, among others.

Based on a similarity between the programming task to be executed and any of the afore-mentioned commits (104), the system may identify completed tasks, i.e., commits, and other supporting documents that are similar to the programming task to be completed. The system (100) may then extract these supporting documents and customize them for the developer based on, for example, a level of expertise of the developer. The supporting material, i.e., the supporting document with annotations and other manipulations is then provided to the computing device (102).

Figure 2:
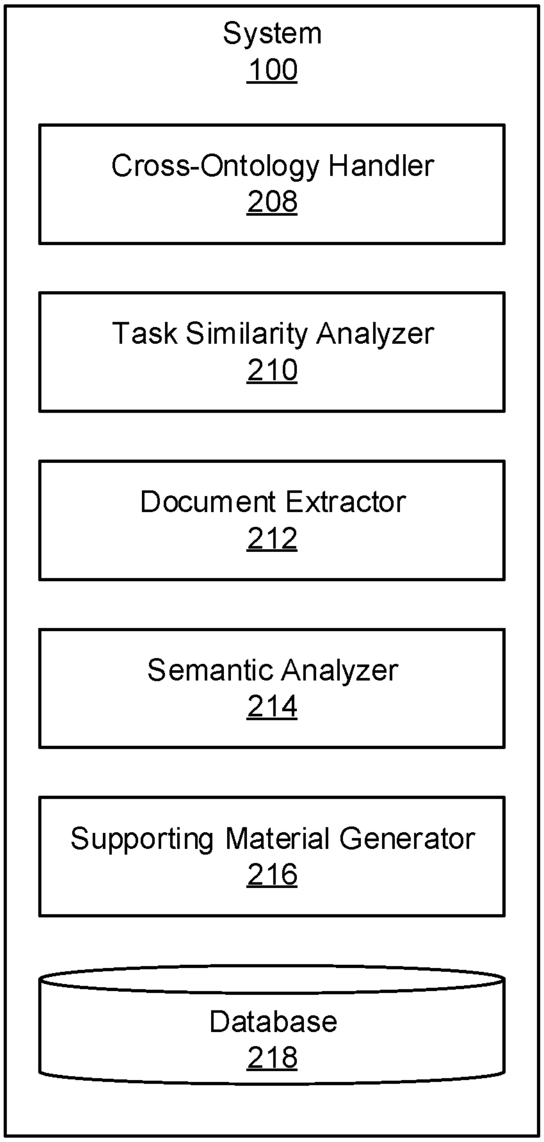
FIG. 2 depicts a system for generating supporting material for a programming task, according to an example of the principles described herein.

FIG. 2 depicts a system (100) for generating supporting material for a programming task, according to an example of the principles described herein. To achieve its desired functionality, the system (100) includes various components. Each component may include a combination of hardware and program instructions to perform a designated function. The components may be hardware. For example, the components may be implemented in the form of electronic circuitry (e.g., hardware). Each of the components may include a processor to execute the designated function of the component. Each of the components may include its own processor, but one processor may be used by all the components. For example, each of the components may include a processor and memory. In another example, one processor may execute the designated function of each of the components. The processor may include the hardware architecture to retrieve executable code from the memory and execute the executable code. As specific examples, the components as described herein may include computer readable storage medium, computer readable storage medium and a processor, an application specific integrated circuit (ASIC), a semiconductor-based microprocessor, a central processing unit (CPU), and a field-programmable gate array (FPGA), and/or other hardware device.

The memory may include a computer-readable storage medium, which computer-readable storage medium may contain, or store computer usable program code for use by or in connection with an instruction execution system, apparatus, or device. The memory may take many types of memory including volatile and non-volatile memory. For example, the memory may include Random Access Memory (RAM), Read Only Memory (ROM), optical memory disks, and magnetic disks, among others. The executable code may, when executed by the processor cause the processor to implement at least the functionality of providing cross-industry supporting materials.

As described above, each industry may have different vocabulary/ontology. For example, in the medical industry a supervisory authority may be a doctor whereas in the oil and gas industry the supervisory authority may be a superintendent or an operations manager. As such, there are different specific practices, nomenclatures, and constructs that are applicable to the program tasks in the different industries.

However, there may be similarities between these industries notwithstanding the different ontologies. For example, a persona may refer to an individual with particular responsibilities. While each industry may have such a persona, each industry may characterize this persona differently. Accordingly, the present system maps the ontologies such that similarities may be determined across industries. Continuing the example from above, a doctor in the medical industry may be mapped to an operations manager in the oil and gas industry such that any programming task involving a doctor may be provided as supporting material for a programming task that involves an operations manager in the oil and gas industry. The system (100) as described herein identifies task similarities and cross-ontology similarities such that supporting materials for a programming task in one industry can be relied on in the execution of a programming task in a different industry, notwithstanding any industry-specific distinctions across the programming tasks.

The system (100) may include a database (106) which includes completed programming tasks and associated supporting documentation per completed programing task. That is, each programming task that is completed may be saved to the database (106), regardless of the industry to which the programming task pertains. It is this database (106) of completed tasks and associated supporting documents that may be relied on in providing supporting materials for second industry task execution.

The database may include any variety of additional supporting documentation including user guides, system help, redbooks, tickets, user comments, plan/track system information, code repositories, etc. While particular reference is made to specific supporting documents in the database (106), the database (106) may include any and different types of supporting documents.

The system (100) may include a cross-ontology handler (208) which identifies, from completed tasks in the database (106), terms that are different but similar to terms in the programming task to be executed. That is, the cross-ontology handler (208) discovers via ontologies, the similarity of activities that are from different industries. The cross-ontology handler (208) may include a processor and memory and is responsible for understanding more than one ontology and mapping entities across multiple ontologies. For instance, "change status" may be an ontology entity that represents an "action." This entity may be found in different ontologies such as a health ontology and an oil and gas ontology. However, those mapped entities perform different validation rules for each ontology. Accordingly, the cross-ontology handler (208) may be able to identify similar activities across different industry domains by mapping the specific industry terms across different industry domains.

The system (100) also includes a task similarity handler (210) which identifies, from the database (106), a completed task that is similar to a programming task to be executed. That is, as described above, different industries may have similar tasks to be executed, notwithstanding differences in the verbiage and variables used. Accordingly, the task similarity analyzer (210) analyzes how similar a programming task to be completed is in relation to previously completed programming tasks. In some examples, the similarity is based on a natural language comparison of the programming task to be executed comprising a variety of techniques, such as, cosine similarity, jaccard distance, normalized compressed distance (NCD), word embeddings, and others. The task similarity analyzer (210) may rely on a mapping generated by the cross-ontology handler (208) in the natural language processing. That is, the cross-ontology handler (208) may generate a mapping between different entities across ontologies and this mapping may be used by a natural language processor to determine whether two tasks are similar.

In an example, the task similarity analyzer (210) may convert the completed task and/or supporting documentation into a vector representation. In such a vector representation, the system (100) may be able to determine whether or not the completed task and/or supporting documentation is in fact similar to the programming task to be completed. That is the programming task that is to be executed may also be converted into a vector representation, and this vector representation may be used to ensure similarity.

In some examples the task similarity analyzer may rely on operations performed by the semantic analyzer (214) to determine similarity. That is, the semantic analyzer (214) may semantically analyze a deliverable output from the programming task and may also semantically analyze the completed task and supporting documentation to aid in similarity determination.

For example, the semantic analyzer (214) may classify the supporting documentation to assign each supporting document a level of abstraction. That is, the supporting documents may be classified based on the level of detail they include. The semantic analyzer (214) which may include a natural language processor or other textual analysis device may analyze the supporting document or metadata associated with the supporting document to ascertain which level of detail is found in the respective supporting document. The level of abstraction may be a numeric value. For example, a numeric value of 0 may indicate the document includes production documentation, while a numeric value of 1 may indicate the document includes a bpm diagram. Similarly, a numeric value of 2 may indicate the document includes a ticket, while a numeric value of 3 indicates a code sample is included in the supporting document.

As another example, the numeric value indicating the level of abstraction may be on a scale from 1 to 5 where 1 includes few details as compared to level 5 which may contain more details to be shown to the developer. The level of abstraction classifier is used, along with the user's profile to determine what level of detail to provide to the user. For example, an experienced user in the industry may have sufficient experience that data with a level of 1 would be sufficient where as an intern or someone new to the industry may desire more detail, as such supporting documents with a level of 5 may be presented.

Thus, in summary, the semantic analyzer (214) infers a text classifier that correlates the vector representation of the supporting documents with the abstraction levels. The abstraction level classifier can be inferred using techniques such as, deep learning neural networks, support vector machines, and naive bayes. As a consequence, the system (100) stores the inferred model as a supporting material model in the database (218).

The system (100) also includes a document extractor (212). After finding suitable supporting documents, i.e., those documents that have a threshold similarity with the programming task to be completed based on some similarity comparison such as natural language processing, are found, the document extractor (212) collects, or extracts, the supporting documentation associated with the completed task that is determined to be similar to the programing task to be analyzed. That is, the document extractor (212) may collect the code snippets, examples of configuration files, commits, etc. from a completed task that is deemed similar to the programming task to be completed. The document extractor (212) may collect other supporting documents as well such as user guides, manuals, etc. that relate to the completed task.

The system (100) also includes the semantic analyzer (214) introduced above. As described there, the semantic analyzer (214) semantically analyzes the supporting documentation. Semantic analysis may include any number of techniques, such as, corpus-based similarity operations and knowledge-based similarity operations.

The system (100) also includes a supporting material generator (216) to generate the supporting material associated with the completed task for a computing device (FIG. 1, 102) to execute the programming task. That is, the supporting material generator (216) packages the collected supporting documentation along with the classifiers such that it can be presented to the developer in a way that is efficient and results in work product that performs as intended.

The supporting material generator (216) may generate the supporting material based on a mapping between the level of abstraction, hierarchical level of a navigable tree graph, a user profile for a developer, wherein the user profile indicates a level of expertise of the developer, and the programming task to be executed. As demonstrated above, the amount of detail with which the supporting material is presented may be based on the level of expertise of the user relative to the programming task to be completed. For example, a senior developer in the finance industry may not demand supporting materials in as much detail as an intern developer. Accordingly, based on the user profile indicating a developer is experienced in an industry related to the programming task to be completed, the supporting material generator (216) may determine that a certain level of abstraction applies, i.e., a level 1 with less detail. This level of abstraction may govern which level of a hierarchical graph of the supporting material is to be presented to the user. For example, the supporting documentation may be presented as a tree graph, where higher levels on the tree graph represent more generic, and less detailed information. Given a senior developer's level of expertise, higher levels may be sufficient as the senior developer already has experience, and thus does not demand the more detailed information. Accordingly, the supporting material generator (216) may include as input the user profile for the developer and the programming task and may output the supporting material at a hierarchical level that maps to the level of abstraction associated with data in the user profile. As such, the system (100) provides supporting documentation for a programming task to be executed. The supporting documentation may come from any industry, not just the industry of the current programming task.

Figure 3:
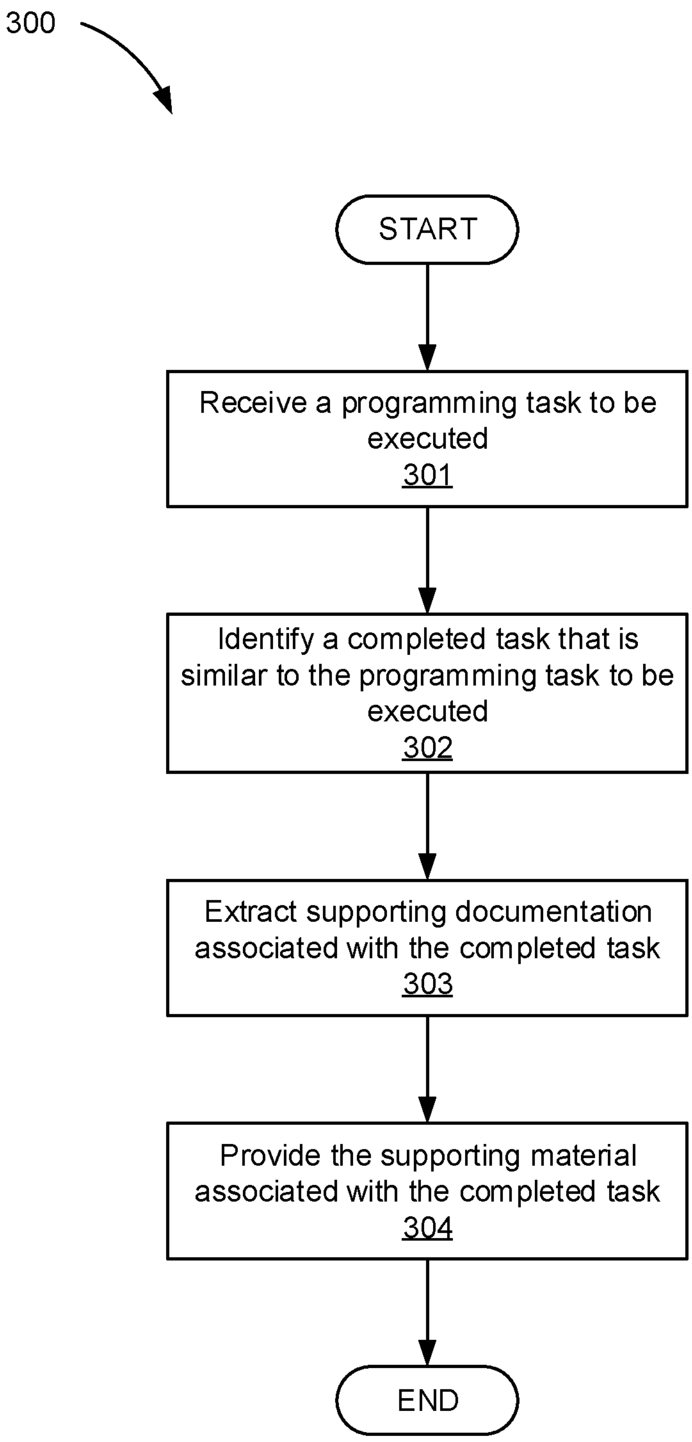
FIG. 3 depicts a flowchart of a method for generating supporting material for a programming task, according to an example of the principles described herein.

FIG. 3 depicts a flowchart of a method (300) for generating supporting material for a programming task, according to an example of the principles described herein. As described above, the system (FIG. 1, 100) may receive (block 301) a programming task to be executed. Such a task may be of a variety of types including updating existing program code and generating new program code among others.

The system (FIG. 1, 100) may include a database (FIG. 2, 218) of completed tasks. The system (FIG. 1, 100) may analyze the database (FIG. 2, 218) to identify (block 302) a completed task that is similar to the programming task to be executed. Such similarity may be determined in a number of ways and may account for difference in ontologies associated with the tasks. That is, as described above different industries may have different nomenclatures and constructs. However, certain nomenclatures and constructs may be similar to nomenclatures and constructs in other industries. Accordingly, the system (FIG. 1, 100) can determine the similarity of tasks in different industries. For example, by performing natural language processing through the lens of a cross-ontology handler (FIG. 2, 208), which allows for similarity determination regardless of contextual differences.

The system (FIG. 1, 100) then extracts (block 303) supporting documentation associated with the completed task that is similar to the programming task to be executed. That is, the supporting documentation may include any number of types of information including examples of code, example of configuration files, world wide web documentation, support manuals, and user manuals to name a few. Other types of supporting documentation may also be collected and compiled. The system (FIG. 1, 100) may then convert the supporting documentation into a structured format referred to as supporting material, wherein a level of abstraction is applied such that the supporting material is presented in a way that is most pertinent to the user given their expertise and background. The system (FIG. 1, 100) then provides (block 304) the supporting material associated with the completed task to the computing device (FIG. 1, 102) such that the target programming task may be completed.

Figure 4:
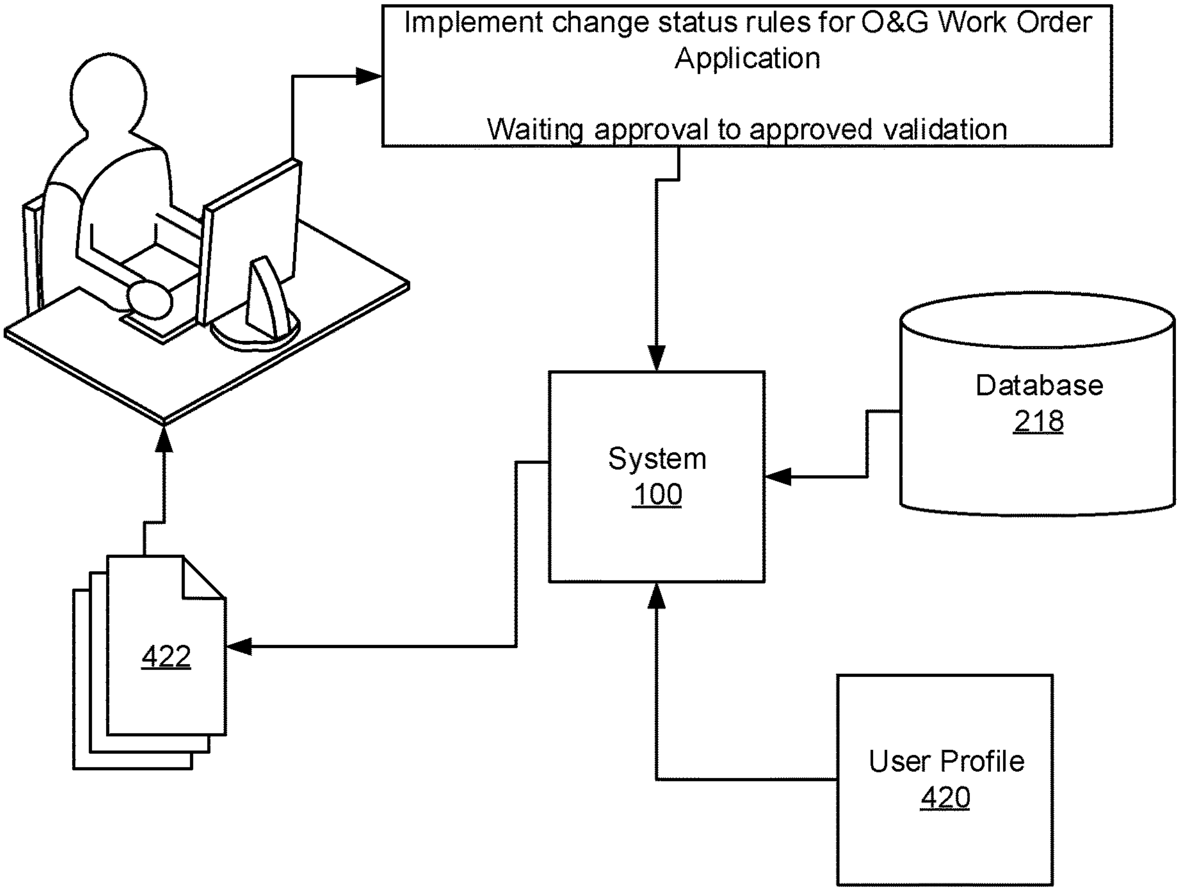
FIG. 4 depicts the generation of supporting material for a programming task based on a user profile, according to an example of the principles described herein.

FIG. 4 depicts the generation of supporting material (422) for a programming task based on a user profile (420), according to an example of the principles described herein. In the example depicted in FIG. 4, the developer to complete a programming task is a senior developer who has experience in the oil and gas industry, but is now in the solar industry. In this example, the programming task is to implement change status rules for a solar work order application. The status change is from “waiting approval” to “approval.”

In this example, the database (218) may identify a completed task that is similarly a change status of a work order application from “waiting approval” to “approved” for a task completed within the oil and gas industry which the developer may be familiar with given their history in the oil and gas industry. In this example, given the similarity in the tasks, there may be overlapping supporting materials (422) which may include code samples of changing the status to “approve” for other records and commit text and comments along with the code explaining work order change status implementation. The provided supporting materials (322) may also include a description of an ISO standard for the solar energy which identifies a process to approve a work order.

As described above, the provision of supporting material may be based on the level of expertise of the user as determined by the user profile (420). For example, a user profile (420) may indicate a title for the user, or may have a database of projects worked on by the user which may indicate the user’s expertise in a particular area. Accordingly, the system (FIG. 1, 100) may receive the user profile (420) for the developer that is executing the programming task, which user profile may indicate a level of expertise of the developer. Based on the level of expertise indicated in the user profile (420), the system (FIG. 1, 100) may identify a target level of abstraction for the provided supporting material. For example, a senior developer may not demand as much supporting material given their familiarity with certain practices. As a specific example, a senior developer in the solar industry tasked with generating a change status rule for a work order application from “waiting approval” to “approved” may be provided with the following supporting materials (422). A code sample of changing the status to approve for other records and commit text and comments along with the code explaining work order status change implementation, and ISO standards for solar energy. For an intern in the solar industry who may not have as much experience executing such a task, additional supporting materials (422) may be provided including an entry on what a work order is from an asset management redbook as well as an entry on status change rules from an asset management redbook. Accordingly, as demonstrated, the supporting materials may be presented at a level of abstraction to match the target level of abstraction.

Figure 5:
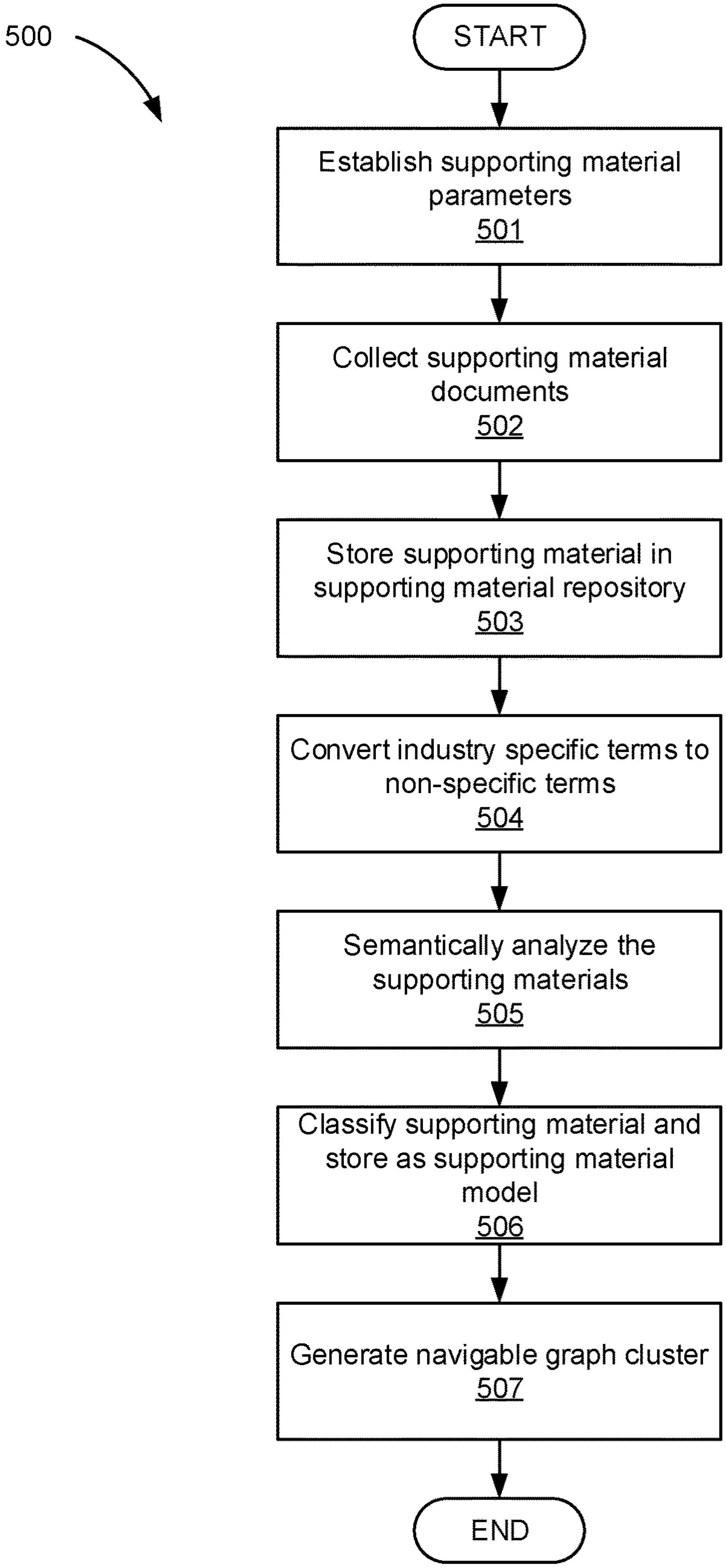
FIG. 5 depicts a flowchart of a method for compiling supporting material for a programming task, according to an example of the principles described herein.

FIG. 5 depicts a flowchart of a method (500) for compiling supporting materials for a programming task, according to an example of the principles described herein. According to the method (500), supporting material parameters are established (block 501). That is, the system (FIG. 1, 100) may define an outline of the layers of abstraction. For example, a level 0 may be defined as product documentation, level 1 as business process modeling (bpm) diagrams, level 2 as tickets, and level 3 as code samples. That is, the system (FIG. 1, 100) may categorize the documentation based on a level of content. For example, if a quality assurance manager is using the system, he/she does not need to receive code samples to do his/her tasks. Another example, if a person is an end user, he/she will not need to receive code samples and tickets. The more specialized the user, the more detailed documentation the system (FIG. 1, 100) generates. Establishing (block 501) supporting material parameters may include labeling the level of abstraction, which may be used to train a classifier. For example, if a document is labeled as having a high level of detail, the system (FIG. 1, 100) may train a classifier that can label a similar document with the same level of abstraction.

The method (500) may include collecting (block 502) supporting documents. The system (FIG. 1, 100) may collect this information from a variety of sources. For example, the system (FIG. 1, 100) may retrieve textual documentation available over the internet and other repositories, in some examples according to the parameters described above. Examples of documents that may be available over the internet include, but are not limited to user guides, system help, and redbooks. As another example of collected material, the system (FIG. 1, 100) may retrieve tickets, user stories, and other items from tracking systems such as Jira and Bugzilla™. As another example, the system (FIG. 1, 100) may retrieve source code from a software configuration management (SCM) repository together with the associated comments according to predefined configurations provided above.

In an example, the supporting documents may be stored (block 503) in a supporting document repository portion of a database (FIG. 2, 218). The supporting document repository may be a portion of the database (FIG. 2, 218) that includes the raw supporting documents like guidance documents, system help documents, examples of source codes, examples of configuration files etc.

In an example, the method (500) includes converting (block 504) the industry specific terms to non-specific terms. Specifically, the cross-industry ontology handler (FIG. 2, 208) translates industry-specific terms to a generic synonym. That is, the cross-industry ontology handler (FIG. 2, 208) replaces an industry-specific terms to a broader term that is common across industries.

The system (FIG. 1, 100) may semantically analyze (block 505) the supporting documents in preparation for determining similarity. Specifically, the system (FIG. 1, 100) may employ natural language processing technique to remove stop-words and irrelevant terms such as numbers, articles and prepositions and converts the text of the supporting documents into vector representations to later employ the aforementioned similarity and machine learning analysis. In one example, the system (FIG. 1, 100) employs term frequency—inverse document frequency (tf-idf) and normalization techniques to reduce the undesired bias of unbalanced data.

The system (FIG. 1, 100) may classify (block 506) the supporting documentation and assign a level of abstraction to the supporting documents, thus converting the supporting documents into supporting materials. That is, the system (FIG. 1, 100) may infer a text classifier to predict the abstraction level of documents using the labels identified above. That is, the system (FIG. 1, 100) infers a text classifier that correlates the vector representation of the supporting materials with the abstraction levels provided as supporting material parameters. The abstraction level classifier can be inferred using techniques such as, deep learning neural networks, support vector machines, and naive bayes. The system (FIG. 1, 100) may store the inferred model in a supporting material model repository of the database (FIG. 2, 218).

The system (FIG. 1, 100) may generate (block 507) a navigable graph cluster. That is, the system (FIG. 1, 100) may employ a hierarchical graph clustering operation to group the supporting materials by creating a dependency and navigable graph. That is, the supporting materials may be organized in hierarchical nodes. For instance, a node N1 could have all content related to "change status" in a cross industry generic form. Each "status condition" can be a child node (e.g., N1.1, N1.2, N1.3), containing documentation of specific rules for each status condition. Then for each one of these child nodes, a new child node could have industry specific rules (e.g., N1.1.1-health, N1.1.2-oil&gas). Such a navigable graph produces a tree-based hierarchy in a way that similar clusters are linked and combined according to a linkage criterion, e.g., single-linkage, complete-linkage, average-linkage, and centroid linkage. To compute the linkage criteria the system (FIG. 1, 100) may employ similarity measures such as, cosine, jaccard, jensen-shannon, and mahalanobis. Thus, with the hierarchical clustering, the system (FIG. 1, 100) creates a dependency and navigable graph that is used to represent the amount of detailed information in which higher-level nodes group larger numbers of supporting materials and lower-level nodes contains a few targeted documents. Such a graph may be stored in a supporting material clusters repository of the database (FIG. 2, 218).

Figure 6:
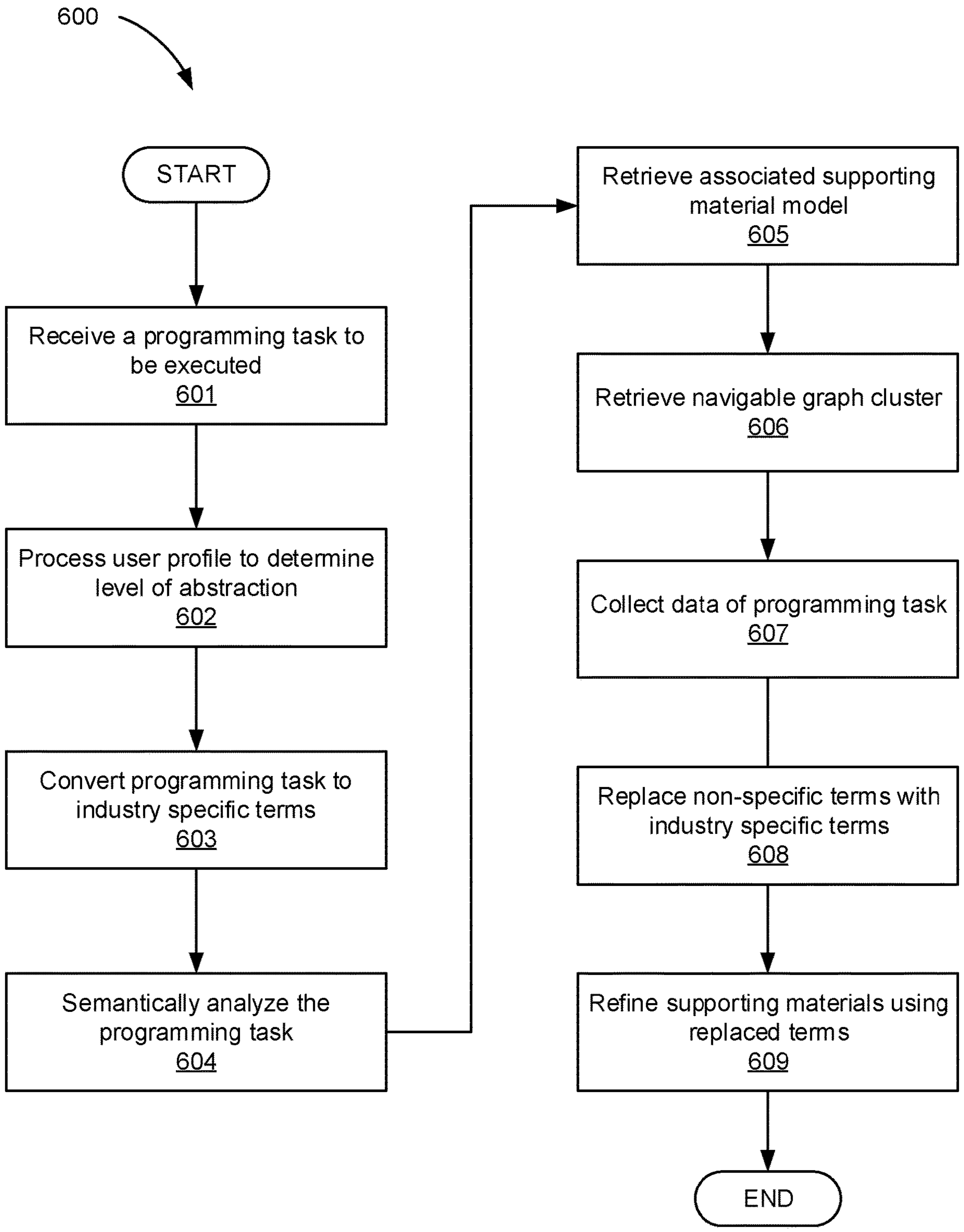
FIG. 6 depicts a flowchart of a method for generating supporting material for a programming task, according to an example of the principles described herein.

FIG. 6 depicts a flowchart of a method (600) for generating supporting documentation for a programming task, according to an example of the principles described herein. According to the method (600) a developer may provide the programming task to be executed. That is, the system (FIG. 1, 100) may receive the programming task that defines a program code alteration to be made. Examples of programming tasks that may be executed include implementing a new functionality, developing a new user story, fixing a bug, etc. As described above, each task may be associated with a particular industry, with best practices and ontologies in the different industries varying between one another.

The method (600) may include processing (block 602) a user profile to determine the level of abstraction. As described above, the level of expertise of a user may dictate how much detail to provide to the user as supporting material for execution of the programming task. For example, a senior developer may be provided with less supporting material given their experience in programming. Accordingly, the system (FIG. 1, 100) processes the user profile to determine his/her capabilities. Such analysis may consider determination of seniority of the developer which may be based on an organizational chart or a library of projects worked on. Such a library of projects worked on may indicate which areas the developer has experience in. Accordingly, a natural language processing of this library and organizational chart may provide a window into the developer's experience. In one example, the system (FIG. 1, 100) may review feedback on previous projects in determining the developer's capability. Examples of feedback used to determine capability is described below in connection with FIG. 7.

The method (600) includes converting (block 603) the programming task to non-specific terms. That is, similar to the supporting documents, the cross-ontology handler (FIG. 2, 208) may translate the programming task, which may be provided with industry specific terms, into broader terms that are applicable across industries.

The method (600) includes semantically analyzing (block 604) the programming task. That is, the semantic analyzer (FIG. 2, 214) employs NLP techniques to remove stop-words, i.e., meaningless terms such as numbers, articles, and prepositions and converts the programming task text into a vector representation. In this example, the system (FIG. 1, 100) may employ any variety of natural language processing operations. In one particular example, the system (FIG. 1, 100) employs term frequency—inverse document frequency (tf-idf) and normalization techniques to reduce the undesired bias of unbalanced data.

The method (600) may include retrieving (block 605) an associated supporting material model. That is, the system (FIG. 1, 100) may retrieve the text classifier to predict the level of abstraction and amount of supporting material according to the user profile and the programming task to be executed. That is, as described above, the supporting material generator determines how much information to provide the user based on information in the user profile as well as the programming task to be executed. Accordingly, the method (600) determines how much detail to provide to the user based on their experience with the programming task to be executed.

The method (600) may include retrieving (block 606) the navigable cluster. As described above, the supporting materials may be generated as a hierarchy where the supporting materials become increasingly detailed lower on the tree graph. That is, the system (FIG. 1, 100) presents the dependency and navigable graph by initially presenting the information at a hierarchical level that is selected based on the level of abstraction associated with the user's experience. That is, the supporting materials are shown in a spatial representation according to their similarities, i.e., by employing projection (e.g., Least Square Projection (LSP)), dimensionality reduction techniques (e.g., Principal Component Analysis (PCA), or latent dirichlet allocation (LDA)). The rationale of presenting the supporting material using a visual representation, as described above, before the user executes the programming task is to allow the user to navigate the supporting materials retrieved in the previous operation in order to complement the knowledge to perform such a task.

The method (600) may include collecting (block 607) data of the programming task. That is, the system (FIG. 1, 100) may collect the terms in the changed system files, i.e., variable names, code comments, system properties, diagrams, while the developer attempts to deliver the deliverable. That is, the system (FIG. 1, 100) collects the terms in the artifacts/code files at the point the developer attempts to deliver the programming task to a source code management system (e.g., Git, Svn, RTC) and executes the semantic analyzer (FIG. 2, 214) (e.g., implementing a latent semantic analysis (LSA)) to retrieve meaningful terms to later enhance the programming task by concatenating the terms removed above via semantic analysis with the terms collected in this operation.

According to the method (600), non-specific terms are replaced (block 608) with industry specific terms. That is, the cross-ontology handler (FIG. 2, 208) returns the programming task terms back to the industry specific terms. Doing so may allow the system (FIG. 1, 100) to retrieve specialized supporting material.

The method (600) may include refining (block 609) supporting materials using replaced terms. That is, the system (FIG. 1, 100) may refine the customized supporting material using the terms processed above by retrieving more specific supporting materials and present these more specific terms to the developer. Refining (block 609) the supporting materials may include retrieving the nearest clusters to the cluster retrieved in the earlier operations having the terms refined in this operation and in the previous one as a reference.

Figure 7:
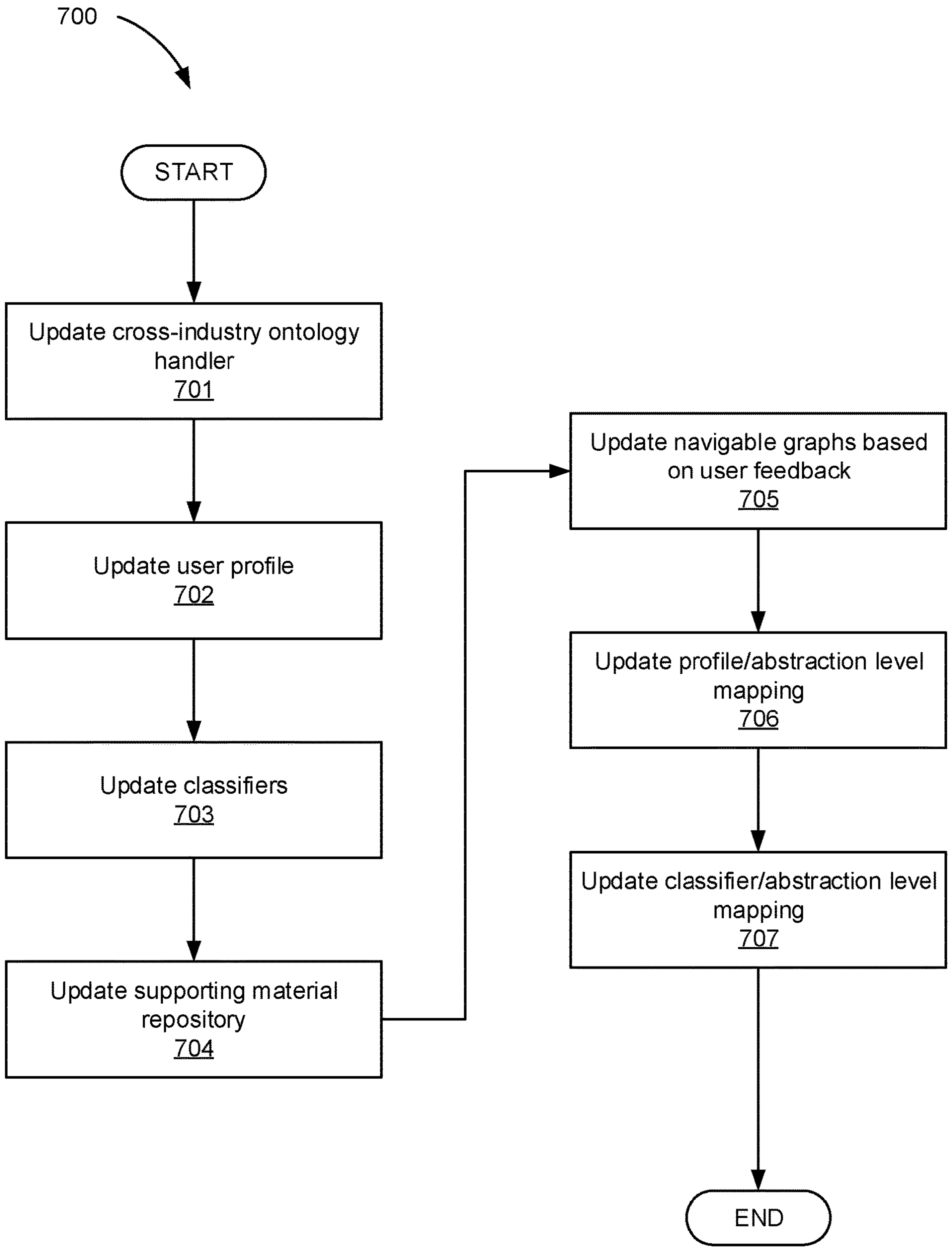
FIG. 7 depicts a flowchart of a method for updating the system for generating supporting material for a programming task, according to an example of the principles described herein.

FIG. 7 depicts a flowchart of a method (700) for updating the system for generating supporting documentation for a programming task, according to an example of the principles described herein. That is, user feedback is relied on the classification of supporting documents and presentation of the supporting material. As such, the system (FIG. 1, 100) may be a machine-learning system that relies on user feedback to enhance its functionality. For example, each time supporting materials are provided to a developer, the system (FIG. 1, 100) may determine whether the information provided was relevant, useful, and correct. This information may be used to re-train the supporting material generation.

According to the method (700), the cross-ontology handler (FIG. 2, 208) his updated based on the programming task. That is, the system (FIG. 1, 100) updates the cross-ontology handler (FIG. 2, 208) by creating new nodes or reinforcing the weight of the existent ones. Specifically, the system (FIG. 1, 100) enhances the cross-industry ontology with the terms that complements the existent ones given its vicinity in the text or reinforces the weight of the existent terms. In some examples, this re-training of the cross-ontology handler (FIG. 2, 208) may occur as the programming task is being developed. Such a loop constantly enhances the supporting material as the user progresses on the task.

The method (700) may include, following completion of the programming task to be executed, updating (block 702) the user profile. Specifically, the system (FIG. 1, 100) may add the completed programming task code to the user profile such that the completed code may be relied on in the future to determine the user's expertise in a given area.

The method (700) may include updating (block 703) the classifiers. That is, the system (FIG. 1, 100) may update the text classifier model to refine the predicted abstraction level and the cluster containing the supporting material considering the terms collected during the programming task. Doing so enables the mapping between the target level of abstraction and the hierarchical level at which the navigable graphs presented to be updated to more accurately deliver the supporting materials to the developer. That is, as the classifiers are used to determine what amount of detail to provide to the developer, updating the classifiers ensures that the correct level of detail is provided to a user given their experience.

The method (700) may include updating (block 704) the supporting material repository. That is, following completion of the programming task, the current programming task may be added to the repository of completed tasks, to be compared against subsequently assigned programming tasks. Updating (block 704) the supporting material repository may also be based on user feedback. That is, the user may have had a specific experience with the presented supporting material and the system (FIG. 1, 100) may capture those experiences via feedback and use the feedback to update the repository. That is, the system (FIG. 1, 100) collects implicit and explicit feedbacks while the user consumes the customized supporting material to update the supporting material repository. Examples of feedback received may include implicit feedback (i.e., biometric or other sensors indicating that the user spent too much time looking for an artifact, pupils' dilation) and explicit feedback (e.g., thumbs up down, satisfactory rates).

The method (700) may include updating (block 705) navigable graphs based on the user feedback and more specifically collecting feedback regarding the hierarchical level at which the navigable graph is presented. That is, the system (FIG. 1, 100) may collect developer feedback about the amount of supporting material and the level of abstraction of the supporting material. That is, the system (FIG. 1, 100) may collect feedback from the developer regarding the appropriateness of the node highlighted in the navigable graph.

The method (700) may include updating (block 707) the classifier/abstraction level mapping. As described above, this mapping provides the system with information as to how much detail to provide to a given developer. Accordingly, the system (FIG. 1, 100) ma assemble a dataset correlating the programming task and the user profile with the level of abstraction of the documents and the amount of supporting material. This dataset may have as input 1) the programming task (e.g., implementing a new functionality, developing a new user story, fixing a bug) and 2) the user profile (e.g., seniority, knowledge about this task). The output may be 1) the level of abstraction and (ii) the id of the chosen cluster in the dependency and navigable graph. Also in this operation, the system (FIG. 1, 100) may infer a text classifier to predict the level of abstraction and amount of supporting material.

Figure 8:
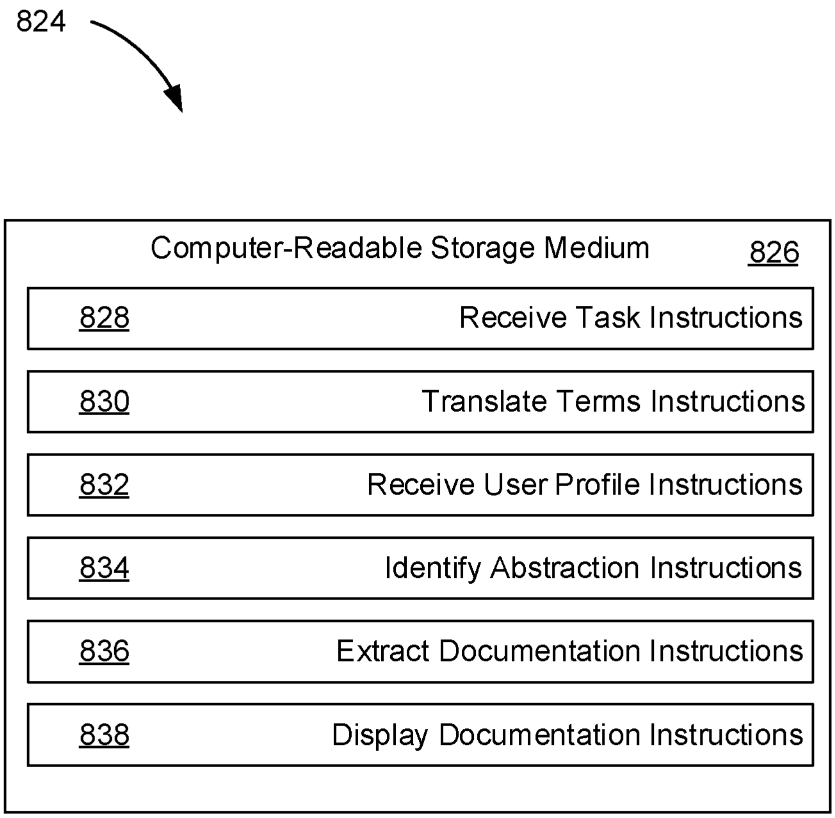
FIG. 8 depicts a computer program product with a computer readable storage medium for generating supporting material for a programming task, according to an example of principles described herein.

FIG. 8 depicts a computer program product (824) with a computer readable storage medium (826) for generating supporting documentation for a programming task, according to an example of principles described herein. To achieve its desired functionality, the system (FIG. 1, 100) includes various hardware components. Specifically, the system (FIG. 1, 100) includes a processor and a computer-readable storage medium (826). The computer-readable storage medium (826) is communicatively coupled to the processor. The computer-readable storage medium (826) includes a number of instructions (828, 830, 832, 834, 836, 838) for performing a designated function. The computer-readable storage medium (826) causes the processor to execute the designated function of the instructions (828, 830, 832, 834, 836, 838).

Referring to FIG. 8, receive task instructions (828), when executed by the processor, cause the processor to receive a programming task to be executed. Translate terms instructions (830), when executed by the processor, may cause the processor to translate industry-specific terms in the programming task to non-specific terms applicable across industries. Receive user profile instructions (832), when executed by the processor, may cause the processor to receive a user profile for a developer to execute the programming task. The user profile indicates a level of expertise of the developer. Identify abstraction instructions (834), when executed by the processor, may cause the processor to identify a target level of abstraction for the provided supporting documentation based on the level of expertise of the developer. Extract documentation instructions (836), when executed by the processor, may cause the processor to extract supporting documentation associated with the completed task that is similar to the programming task to be executed. Display documentation instructions (838), when executed by the processor, may cause the processor to display the supporting documentation associated with the completed task to a computing device to execute the programming task. The supporting documentation may be presented as a navigable graph that is presented at a hierarchical level to match the target level of abstraction.

In summary, the present specification describes a method that includes an action where, in response to initiating a system according to predetermined types of supporting material documents using a parameter indicating document sources associated to respective levels of detail according to their content, retrieving textual documentation available over a network from predetermined repositories using predefined configurations associated with the predetermined types of supporting material documents.

In an example, the method includes retrieving additional items including tickets, user stories, and other items from planning/tracking systems using the predefined configurations associated with the predetermined types of supporting material documents. In an example, the method includes retrieving source code from repositories together with associated comments using the predefined configurations associated with the predetermined types of supporting material documents. The method includes storing artifacts retrieved in a supporting material repository including parsing content to keep just textual data.

Industry-specific terms are translated to corresponding generic synonyms using a cross-industry ontology. The textual data is converted into a vector representation using methods including natural language processing techniques to remove stop-words, a bag-of-words technique to transform the textual data and normalization to reduce an undesired bias of unbalanced data. An abstraction level of the documents is predicted using an inferred text classifier with labelled documents stored as artifacts to correlate the vector representation of the supporting materials with abstraction levels of the predetermined types of supporting material documents. The inferred model may be stored in a supporting material models repository.

In an example, a dependency and navigable graph is generated using hierarchical clustering with the vector representation of the supporting materials to create a tree-based hierarchy, linking and combining similar clusters according to predetermined linkage criteria, as a representation of an amount of detailed information in which higher-level nodes groups larger numbers of supporting materials and lower-level nodes contain a few targeted documents. The dependency and navigable graph may be stored in a supporting material clusters repository.

Using user feedback, a most appropriate node of the dependency and navigable graph is determined in response to collecting the user feedback about a level of abstraction of the documents and amount of supporting material while retrieving the similar clusters.

A dataset may be assembled that correlates a programming task and a user profile with the level of abstraction of the documents and the amount of supporting material. A text classifier may be inferred using the dataset to predict a level of abstraction and an amount of supporting material by converting the textual data into a vector representation using methods including natural language processing techniques to remove stop-words, a bag-of-words technique to transform the textual data of the user profile and the programming tasks and normalization to reduce an undesired bias of unbalanced data.

In an example, responsive to receiving a programming task by a user, the system detects a user profile according to capabilities and history of feedback of the user.

The programming task may be translated to the industry specific terms using the cross-industry ontology. The programming task is converted into a vector representation using methods including natural language processing techniques to remove stop-words, a bag-of-words technique to transform the textual data of the programming task and normalization to reduce an undesired bias of unbalanced data. The level of abstraction and amount of supporting material is predicted using the user profile and the programming task with the text classifier model.

Customized supporting material clusters are presented according to the level of abstraction and amount of supporting material predicted in the form of the dependency and navigable graph focusing on a cluster predict in which the supporting materials are shown in a spatial representation according to their similarities.

In response to a user attempting to deliver the programming task, the programming task is enhanced by collecting terms in changed system files, including variable names, code comments, system properties, and diagrams, using a semantic analysis technique to retrieve meaningful terms to later enhance the programming task by concatenating terms processed in converting the programming task text into a vector representation with the terms collected.

In an example, system file terms are translated to the industry specific terms using the cross-industry ontology retrieved.

Customized supporting material may be refined using the system files terms translated by retrieving more specific supporting materials of nearest clusters from the dependency and navigable graph according to the system file terms translated. Customized supporting material refined by the developer is presented. The cross-industry ontology handler may be enhanced with terms that at least one of complement existent terms given a relative vicinity in a text and reinforces weight of the existent terms.

The user profile repository may be updated with code delivered by the user. In an example, the abstraction level and clusters containing the additional supporting material provided by the user are predicted using the text classifier model and considering the terms collected during the programming task.

In an example, the abstraction level and cluster are presented to the user and the supporting material repository is updated using collected implicit and explicit feedback while the user consumes the customized supporting material.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. In one example, the computer usable program code may be embodied within a computer readable storage medium; the computer readable storage medium being part of the computer program product. In one example, the computer readable storage medium is a non-transitory computer readable medium.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

receiving a programming task associated with a first industry to be executed, wherein the programming task defines a program code alteration to be executed;

translating industry-specific terms for the program code alteration in the programming task associated with the first industry to non-specific terms for the program code alteration applicable across multiple industries that includes a second industry, wherein the non-specific terms for the program code alteration represent generic synonyms of the industry-specific terms for the program code alteration;

identifying, from a database of completed tasks, a completed task associated with the second industry based on a similarity to the programming task to be executed and the non-specific terms;

extracting supporting documentation associated with the completed task that is similar to the programming task to be executed, wherein the supporting documentation includes source code;

generating supporting material to execute the programming task associated with the first industry based on the supporting documentation associated with the completed task associated with the second industry, wherein the generating includes replacing the non-specific terms from the supporting documentation with the industry-specific terms; and displaying, via a computing device, the supporting material as a navigable graph by a user, wherein the navigable graph is presented at a hierarchical level to match a target level of abstraction, wherein the displaying further includes:

displaying, via the computing device, higher-level nodes of the navigable graph with a larger number of the supporting documentation compared to lower-level nodes of the navigable graph.

2. The method of claim 1, wherein identifying the completed task associated with the second industry is based on a natural language comparison of the completed tasks in the database with the programming task to be executed.

3. The method of claim 1, further comprising:

following completion of the programming task to be executed, replacing the non-specific terms in the programming task with the industry-specific terms associated with the first industry.

4. The method of claim 1, wherein the supporting material is presented at a level of abstraction to match the target level of abstraction.

5. The method of claim 1, further comprising:

following completion of the programming task to be executed, updating a user profile with the programming task to update the level of expertise of the user.

6. The method of claim 1, wherein the navigable graph includes different hierarchical levels having different levels of abstraction.

7. The method of claim 1, further comprising: generating a supporting material model from the supporting documentation.

8. The method of claim 7, wherein generating the supporting material model further comprises:

collecting supporting documents;

converting industry specific terms in the supporting material to the non-specific terms applicable across industries; and assigning a level of abstraction to the supporting documents.

9. A computer program product comprising:

one or more non-transitory computer-readable storage media; and program instructions stored on the one or more non-transitory computer-readable storage media to perform operations comprising:

receiving a programming task associated with a first industry to be executed, wherein the programming task defines a program code alteration to be executed;

translating industry-specific terms for the program code alteration in the programming task associated with the first industry to non-specific terms for the program code alteration applicable across multiple industries that includes a second industry, wherein the non-specific terms for the program code alteration represent generic synonyms of the industry-specific terms for the program code alteration;

identifying, from a database of completed tasks, a completed task associated with the second industry based on a similarity to the programming task to be executed and the non-specific terms;

extracting supporting documentation associated with the completed task that is similar to the programming task to be executed, wherein the supporting documentation includes source code;

generating supporting material to execute the programming task associated with the first industry based on the supporting documentation associated with the completed task associated with the second industry, wherein the generating includes replacing the non-specific terms from the supporting documentation with the industry-specific terms; and displaying, via a computing device, the supporting material as a navigable graph by a user, wherein the navigable graph is presented at a hierarchical level to match a target level of abstraction, wherein the displaying further includes:

displaying, via the computing device, higher-level nodes of the navigable graph with a larger number of the supporting documentation compared to lower-level nodes of the navigable graph.

10. The computer program product of claim 9, wherein identifying the completed task associated with the second industry is based on a natural language comparison of the completed tasks in the database with the programming task to be executed.

11. The computer program product of claim 9, wherein the operations further comprise:

following completion of the programming task to be executed, replacing the non-specific terms in the programming task with the industry-specific terms associated with the first industry.

12. The computer program product of claim 9, wherein the operations further comprise:

receiving a user profile for a developer to execute the programming task, wherein the user profile indicates a level of expertise of the developer; and identifying the target level of abstraction for the supporting material based on the level of expertise of the developer.

13. The computer program product of claim 12, wherein the operations further comprise:

updating the user profile with the programming task to update the level of expertise of the developer.

14. The computer program product of claim 9, wherein the navigable graph includes different hierarchical levels having different levels of abstraction.

15. The computer program product of claim 9, wherein the operations further comprise:

generating a supporting material model from the supporting documentation.

16. The computer program product of claim 15, wherein generating the supporting material model from the supporting documentation comprises:

collecting supporting documents;

converting industry specific terms in the supporting material to the non-specific terms applicable across industries; and assigning a level of abstraction to the supporting documents.

* * * * *